United States Patent [19]

Eisenberg

[11] 4,057,913
[45] Nov. 15, 1977

[54] SIMULATED TRAINING SYSTEM THAT UTILIZES OPERATIONAL EQUIPMENT

[75] Inventor: Robert M. Eisenberg, Woodbine, Md.

[73] Assignee: The Singer Company, Binghamton, N.Y.

[21] Appl. No.: 670,620

[22] Filed: Mar. 26, 1976

[51] Int. Cl.$^2$ .............................................. G09B 9/08
[52] U.S. Cl. ...................................... 35/12 B; 35/10.4
[58] Field of Search .............. 35/12 B, 12 R, 25, 10.2, 35/10.4

[56] References Cited

U.S. PATENT DOCUMENTS

| 2,027,527 | 1/1936 | Hammond, Jr. .................. 35/12 B X |
| 3,164,787 | 1/1965 | Fontaine .......................... 35/10.4 X |
| 3,649,735 | 3/1972 | Coburn et al. ...................... 35/10.4 |

OTHER PUBLICATIONS

*Aviation Week and Space Technology*, Aug. 9, 1971, pp. 35–38.

*Primary Examiner*—William H. Grieb
*Attorney, Agent, or Firm*—Ronald Reichman; James C. Kesterson

[57] ABSTRACT

The invention of this disclosure is a training system that utilizes operational equipment in conjunction with ground-based simulation training equipment. The apparatus of this invention comprises airborne military aircraft that contains avionics equipment, an on-board computer coupled to a transmitter and a receiver coupled to the aircraft for receiving signals from the ground-based simulator. The aircraft transmits signals to an interface unit that sends those signals to a simulator that receives and processes signals from the interface unit to cause an acoustic generator to produce the same signals that would be generated by some surface ship or submarine, as detected by a plurality of sonobuoys. The acoustic sounds generated by the simulator are transmitted to the receiver aboard the aircraft. Thus, this invention enables a flight crew to train on a simulator while flying in an actual aircraft.

7 Claims, 1 Drawing Figure

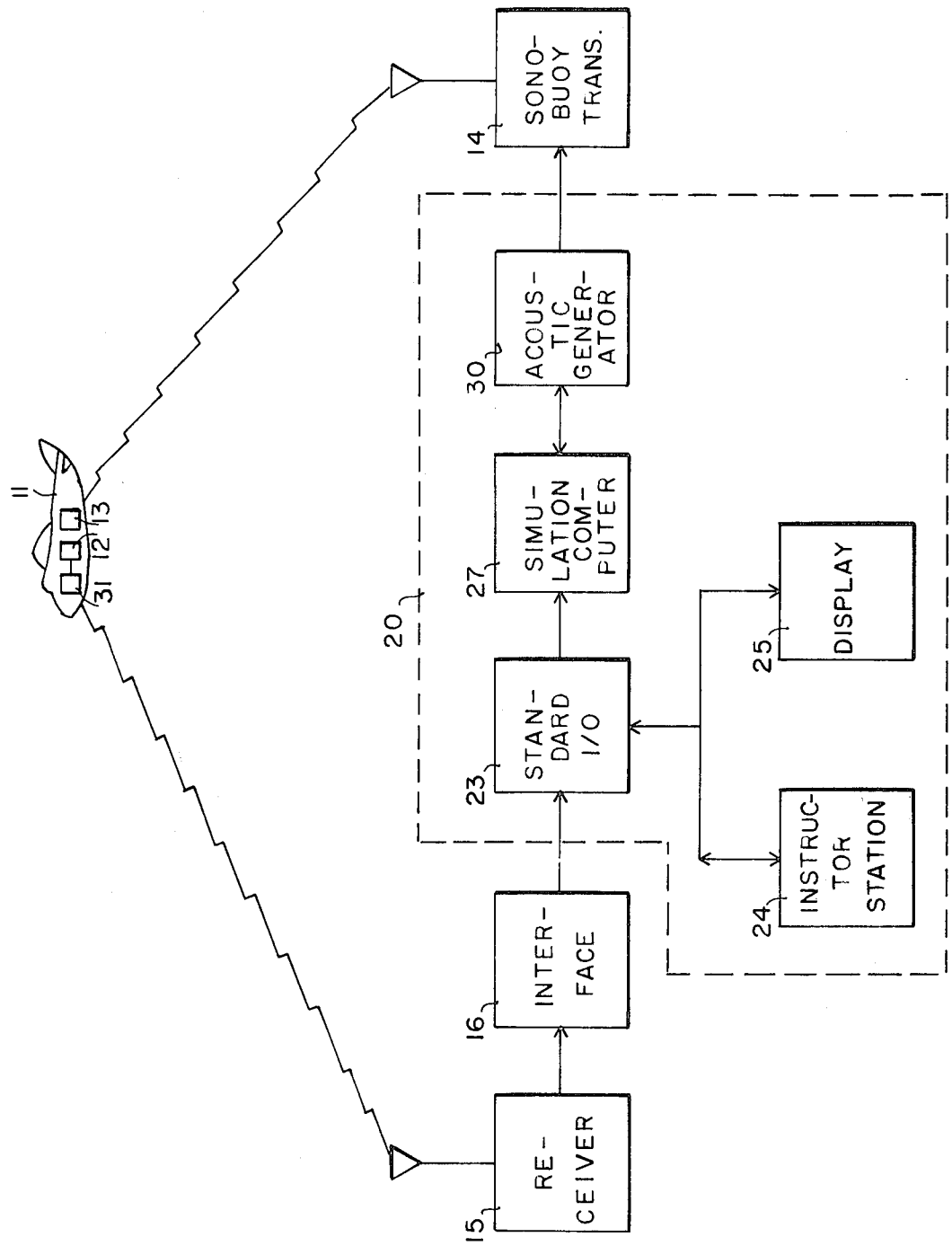

SIMULATED TRAINING SYSTEM THAT UTILIZES OPERATIONAL EQUIPMENT

BACKGROUND OF THE INVENTION

1. Field of the Invention

This invention relates to training systems and, more particularly, to training systems that use operational equipment so that students may train in a real-world environment.

2. Description of the Prior Art

In the past there have been two methods in which military flight crews increase their proficiency and their ability to use an aircraft's avionics equipment. The first method was for the flight crew to board the aircraft and take the airplane on an actual flight in which all of the equipment aboard the aircraft was used to detect and attack some target. This method proved to be expensive and dangerous since armaments cost a great deal of money and the military had to insure that no people would be around to be injured and/or annoyed by any explosions. The second method was for the flight crew to train in a device on the ground called a simulator. The simulator gave the flight crew the impression of undergoing an actual flight without ever leaving the ground. Normal and emergency flight conditions were duplicated and the ability of the flight crew to operate the instruments aboard the aircraft and follow commands were accurately recorded so that an instructor could explain to the flight crew any errors that they made in the simulated flight. The invention of this disclosure is a training system that is a hybrid between the actual operational equipment and a simulated environment. Even though a flight simulator duplicates as closely as possible the conditions that exist in the real world, certain environmental conditions cannot be accurately duplicated. For instance, the g forces that the flight crew would experience in an actual flight cannot be duplicated in a flight simulator and the view that the flight crew has from a simulator is more restricted than the view from an actual aircraft.

SUMMARY OF THE INVENTION

The avionics equipment aboard today's military aircraft are so complex that the people who use the avionics equipment must be taught certain specialized skills. Certain mental and physical conditioning must be taught to the flight crew so that they will be able to operate the avionics equipment in a moving environment. This invention overcomes the disadvantages of the prior art by providing a unique interconnection of a simulated and a real-world situation. The invention of this disclosure supplies a logical step between the flying of an actual combat mission and a training flight aboard a flight simulator. Thus, this invention enables the flight crew to perform the same tasks in an actual aircraft environment that they would perform in a flight simulator. The crew is able to operate the aircraft's avionics equipment and simulate the firing of the aircraft's weapons at a target selected by an instructor. The instructor is able to monitor the flight crew's performance from a remote point, determine the crew's performance under actual flight conditions and compare the crew's performance to other crews that must fly identical missions. Without departing from the spirit of this invention, it would also be possible to simulate the sensors aboard other types of equipment such as ships, tanks, etc.

It is an object of this invention to provide a new and improved training system.

It is another object of this invention to provide a new and improved training system that utilizes some systems' operational equipment.

It is a further object of this invention to provide a training environment that duplicates the conditions found in the real world.

Other objects and advantages of this invention will become apparent as the following description proceeds, which description should be considered together with the accompanying drawing.

BRIEF DESCRIPTION OF THE DRAWING

The single FIGURE is a block diagram showing the apparatus of this invention.

DESCRIPTION OF A PREFERRED EMBODIMENT

Referring now to the drawing in detail, the reference character 11 designates an airborne military aircraft that contains an on-board computer 12 and a plurality of radio receivers 13 that are tuned to the frequency of a plurality of sonobuoy transmitters 14 that were simulated as being dropped into the ocean. The sonobuoy transmitters 14 receive acoustic data and transmit that data to the airborne aircraft 11. Computer 12 receives data from the instruments aboard aircraft 11, such as the aircraft's flight parameters. Information pertaining to the aircraft avionics system is either automatically entered into computer 12 by means of sensors or entered into the computer by members of the flight crew. Computer 12 is coupled to a transmitter 13 that transmits upon the proper commands the output of computer 12 to a receiver 15. Receiver 15 may be either on the ground or in another aircraft. The data received by receiver 15 is transmitted to interface 16. Interface 16 receives two types of data from receiver 15. The first type is the aircraft's flight parameters and the second type is data from the avionics system aboard the aircraft. The aircraft's flight parameters are transmitted to the standard input/output (I/O) 23 of simulator 20. The flight parameters are used in the simulation program to determine the location and flight path of the aircrft. Data pertaining to the avionics system is transmitted to the standard I/O 23 of simulator 20 where the data is processed and then displayed by the simulator. Simulator 20 comprises a standard I/O 23 that receives data from interface 16, an instructor's station 24 that is coupled to I/O 23, a display device 25 that displays some of the data received by I/O 23 and some of the data entered into the instructor's station, a simulation computer 27 that is coupled to I/O 23 and acoustic generator 30 that transmits and receives information from the simulation computer 27. Acoustic generator 30 also transmits information to sonobuoy transmitters 14. The information that the instructor enters into instructor station 24 causes simulation computer 27 and acoustic generator 30 to produce a synthetic target; that is, some signal that sounds and looks like it was produced from some submarine or surface vessel. The existing simulation programs compute the ranges and bearings of the generated synthetic target and transmit this information to acoustic generator 30. The acoustic generator 30 operates on the generated signal with this information to modify signal strength, etc. The simulated signals received by the sonobuoy transmitters 14 are displayed by the simulator 20 and are also transmitted to a plurality of receivers 13 aboard aircraft 11. A member of the flight crew tunes the receivers to a particular frequency so that they will receive the signals transmitted from the sonobuoy transmitters 14. The frequency modulated signals that are transmitted by sonobuoy 14 are the same signals that sonobuoy transmitters 14 would produce if the operational sonobuoys picked up an actual target instead of a synthetic target that was generated by computer 27 and acoustic generator 30. Thus, to the flight crew and their aircraft's equipment, there is no difference between the signal produced from a synthetic target and a signal that would be produced from an actual target. Hence, the flight crew would perform the same procedures in trying to locate the position of the synthetic target as they would to find an actual target.

The apparatus of this invention enables an instructor to create a synthetic target and monitor the performance of the flight crew as they attempt to locate, classify and/or attack the synthetic target.

The above specification describes a new and improved training equipment that utilizes operational equipment. It is realized that the above description may indicate to those skilled in the art additional ways in which the principles of this invention may be used without departing from its spirit. It is, therefore, intended that this invention be limited only by the scope of the appended claims.

What is claimed is:

1. A training system that utilizes simulation and operational equipment to train operators in a real-world environment which comprises: a receiver that receives signals pertaining to the location and status of operational equipment from said operational equipment, means for transmitting signals to operational equipment, and a simulator coupled to said receiver and said transmitting means for processing the signal received from said receiver and producing a signal that will stimulate operational equipment when the signal produced by said simulator is transmitted to the operational equipment by said transmitting means.

2. A training system that permits one or more students to utilize operational equipment to solve the problems that were entered into the training system by an instructor, said training system comprising means for receiving signals pertaining to the location and status of operational equipment from said operational equipment, means for transmitting signals to the sensors aboard the operational equipment, a simulator coupled to said transmitting means and said receiving means that processes the problems that were entered by an instructor and produces signals that will stimulate the sensors aboard the operational equipment when the signals are transmitted to the operational equipment by said transmitting means, whereby one or more students may operate the operational equipment and receive training in a real-world environment without undergoing some of the dangers that would exist if only operational equipment were used.

3. The system claimed in claim 2 further including an interface unit that is coupled between said simulator and the operational equipment to make the signals produced by said simulator and said operational equipment compatible.

4. A training system that stimulates the avionics equipment aboard an actual aircraft so that one or more students who are in the aircraft can be trained in the use and operation of the aircraft's avionics equipment while the avionics equipment is being controlled and monitored by a simulator, said system comprising an aircraft that has avionics transmitting and receiving equipment so that said aircraft can send and receive information pertaining to said aircraft's avionics equipment, receiving means coupled to said aircraft for receiving signals from said aircraft, a simulator coupled to said receiving means for processing data received from said receiving means to create a series of signals that will stimulate the avionics equipment aboard said aircraft and transmitting means coupled to said simulator and said aircraft for transmitting the signal produced by said simulator to said aircraft so that the avionics equipment aboard said aircraft will be stimulated enabling one or more students to use and operate the avionics equipment while the avionics equipment is being monitored and controlled by a simulator that is under the control of an instructor.

5. The system defined in claim 4 further including an interface unit that is coupled between said simulator and said aircraft to make the signals produced by said simulator and said aircraft compatible.

6. The system defined in claim 4 wherein said transmitting means are a plurality of sonobuoy transmitters.

7. The system defined in claim 6 further including an acoustic generator that is coupled to said simulator and said sonobuoy transmitters for generating acoustic signals.

* * * * *